(12) United States Patent
Hu et al.

(10) Patent No.: US 9,897,899 B2
(45) Date of Patent: Feb. 20, 2018

(54) LIGHT-EMITTING DEVICE AND PROJECTION SYSTEM

(71) Applicant: APPOTRONICS CORPORATION LIMITED, Shenzhen (CN)

(72) Inventors: Fei Hu, Shenzhen (CN); Jiayi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/326,873

(22) PCT Filed: Jul. 8, 2015

(86) PCT No.: PCT/CN2015/083505
§ 371 (c)(1),
(2) Date: Jan. 17, 2017

(87) PCT Pub. No.: WO2016/015552
PCT Pub. Date: Feb. 4, 2016

(65) Prior Publication Data
US 2017/0205695 A1    Jul. 20, 2017

(30) Foreign Application Priority Data
Jul. 28, 2014    (CN) .......................... 2014 1 0364651

(51) Int. Cl.
*G03B 21/14*    (2006.01)
*H04N 9/31*    (2006.01)
(Continued)

(52) U.S. Cl.
CPC ....... *G03B 21/204* (2013.01); *G02B 19/0014* (2013.01); *G02B 27/141* (2013.01); *G03B 21/2066* (2013.01)

(58) Field of Classification Search
CPC .... G03B 21/14; G03B 21/005; G03B 21/006; G03B 21/008; G03B 21/204; H04N 9/3197; G02B 27/10; G02B 27/1006
See application file for complete search history.

(56) References Cited

U.S. PATENT DOCUMENTS

| | | | |
|---|---|---|---|
| 2012/0242912 A1 | 9/2012 | Kitano | |
| 2016/0026076 A1* | 1/2016 | Hu | ........................ G03B 21/204 353/84 |
| 2016/0085143 A1* | 3/2016 | Hu | ..................... G03B 21/2013 362/553 |

FOREIGN PATENT DOCUMENTS

| | | |
|---|---|---|
| CN | 203217230 U | 9/2013 |
| CN | 103913936 A | 7/2014 |
| CN | 204028554 U | 12/2014 |

OTHER PUBLICATIONS

The World Intellectual Property Organization (WIPO) International Search Report for PCT/CN2015/083505 dated Oct. 9, 2015 p. 1-6.

* cited by examiner

*Primary Examiner* — William C Dowling
(74) *Attorney, Agent, or Firm* — Anova Law Group, PLLC (57) ABSTRACT

The present disclosure discloses a light-emitting device and a projection system, comprising: a light source, configured to emit excitation light; a beam-splitting-combining plate disposed in an outgoing light path of the excitation light, and including a beam-splitting portion configured to split the excitation light into a first excitation light and a second excitation light along different propagation paths; a first wavelength conversion device including a first wavelength converting layer configured to absorb the first excitation light to generate first excited light; and a second wavelength conversion device configured to reflect the second excitation light back to the beam-splitting-combining plate. The beam- (Continued)

splitting-combining plate further includes a beam-combining portion disposed around the beam-splitting portion, and the beam-combining portion is configured to combine the first excited light and the second excitation light respectively reflected to the beam-splitting-combining plate into one beam.

18 Claims, 3 Drawing Sheets

(51) Int. Cl.
    *G02B 27/10*          (2006.01)
    *G03B 21/20*          (2006.01)
    *G02B 27/14*          (2006.01)
    *G02B 19/00*          (2006.01)

LIGHT-EMITTING DEVICE AND PROJECTION SYSTEM

CROSS-REFERENCES TO RELATED APPLICATIONS

This application is a national stage patent application of PCT application No. PCT/CN2015/083505, filed on Jul. 8, 2015, which claims priority to Chinese Patent Application No. 201410364651.9, filed on Jul. 28, 2014, the entire content of all of which is incorporated herein by reference.

FIELD OF THE INVENTION

The present disclosure relates to the technical field of laser display, and more specifically, relates to a light-emitting device and a projection system.

BACKGROUND

Existing projection systems irradiate light emitted from various light sources onto various wavelength conversion devices to generate excited light of different colors, such as red excited light, green excited light and blue excited light, which is then combined into white light to display projection images.

Figure 1:
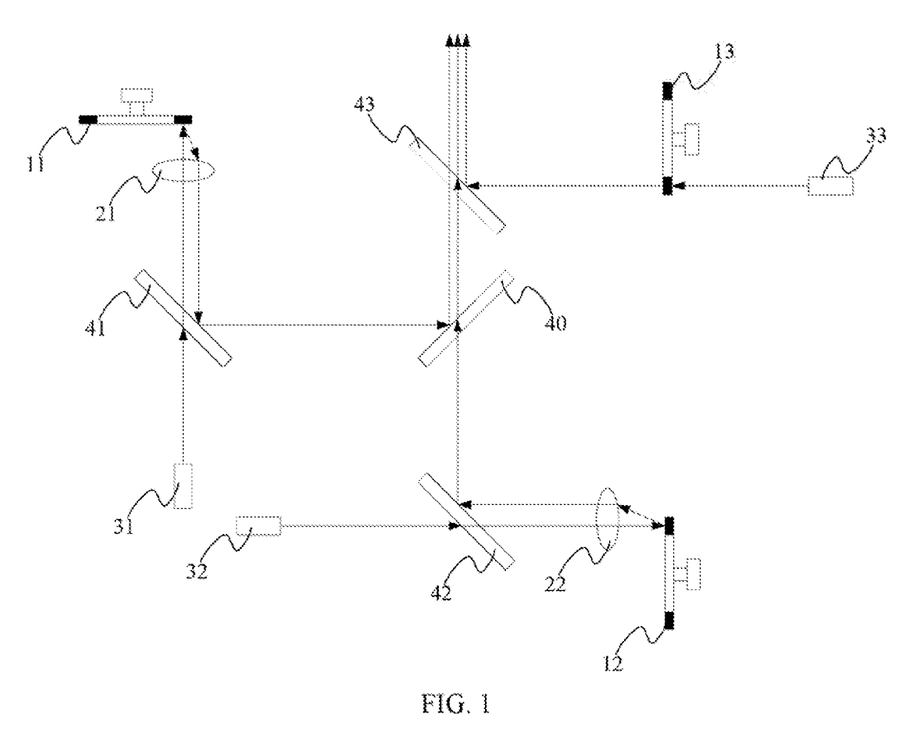
FIG. 1 illustrates a schematic diagram of an existing projection system.

As shown in FIG. 1, an existing projection system comprises laser modules 31, 32 and 33 for emitting blue light; a wavelength conversion device 11 including green/yellow phosphor, a wavelength conversion device 12 including red/yellow phosphor, a diffusing color wheel 13, condenser lenses 21 and 22 respectively corresponding to the wavelength conversion devices 11 and 12 for converging collimated light, a filter 41 for transmitting blue light while reflecting other light, a filter 42 for transmitting blue light while reflecting red light, a filter 40 for transmitting red light while reflecting other light, and a filter 43 for reflecting blue light while transmitting other light.

In particular, after passing through the filter 41 and the condenser lens 21, the blue light emitted from the laser module 31 is incident onto the wavelength conversion device 11 to generate green light. Then, the green light is incident onto the filter 43 after being reflected by the filter 41 and the filter 40. After passing through the filter 42 and the condenser lens 22, the blue light emitted from the laser module 32 is incident onto the wavelength conversion device 12 to generate red light. Then the red light is incident onto the filter 43 after being reflected by the filter 42 and the filter 40. After being diffused by the diffusing color wheel 13, the blue light emitted from the laser module 33 is incident onto the filter 43. Then the green light and red light transmitted by the filter 43, and the blue light reflected by the filter 43 are combined into white light for displaying projection images.

However, because the projection system relies on different light sources to generate different excited light, and different filters to filter or combine different excited light, the size of the projection system is bulky and the cost of the projection system is high.

BRIEF SUMMARY OF THE DISCLOSURE

In view of this, the present disclosure provides a light-emitting device and a projection system to solve the problem of bulky size and high cost in existing projections systems.

To achieve the above purposes, the present disclosure provides the following technical solutions:

a light-emitting device, comprising:
a light source, configured to emit excitation light;
a beam-splitting-combining plate disposed in an outgoing light path of the excitation light, wherein the beam-splitting-combining plate includes a beam-splitting portion configured to split the excitation light into a first excitation light and a second excitation light with different propagation paths;
a first wavelength conversion device disposed in an outgoing light path of the first excitation light, and including a first wavelength converting layer, wherein the first wavelength converting layer is configured to absorb the first excitation light to generate first excited light, and reflect the first excited light back to the beam-splitting-combining plate; and
a second wavelength conversion device disposed in an outgoing light path of the second excitation light and configured to reflect the second excitation light back to the beam-splitting-combining plate,
wherein the beam-splitting-combining plate further includes a beam-combining portion disposed around the beam-splitting portion, and
the beam-combining portion is configured to combine the first excited light and the second excitation light respectively reflected to the beam-splitting-combining plate into one beam.

Optionally, the beam-splitting portion is disposed at a central area of the beam-splitting-combining plate, and the beam-splitting portion includes a semi-transmitting and semi-reflecting film.

Optionally, the second wavelength conversion device further includes a second wavelength converting layer, and the second wavelength converting layer is configured to absorb the second excitation light to generate second excited light, and reflect the second excited light back to the beam-splitting-combining plate.

Optionally, when the second wavelength conversion device further includes the second wavelength converting layer, the beam-combining portion is configured to combine the first excited light, the second excited light, and the second excitation light respectively reflected to the beam-splitting-combining plate into one beam.

Optionally, the beam-combining portion includes a filter configured to reflect the first excited light and transmit the second excited light and the second excitation light, or a filter configured to transmit the first excited light and reflect the second excited light and the second excitation light.

Optionally, the beam-splitting portion includes a filter configured to partially transmit and partially reflect the excitation light, reflect the first excited light, and transmit the second excited light, or a filter configured to partially transmit and partially reflect the excitation light, transmit the first excited light, and reflect the second excited light.

Optionally, the first wavelength converting layer or the second wavelength conversion converting layer includes red phosphor, which absorbs the excitation light to generate excited light containing near-infrared light. Optionally, when the second wavelength converting layer includes the red phosphor which absorbs the excitation light to generate the excited light containing near-infrared light, the first wavelength converting layer includes yellow phosphor.

Optionally, when the first excitation light has a same propagation path as the excitation light, the beam-combining portion includes a filter, configured to transmit light with a wavelength less than 480 nm or greater than 650 nm, and reflect light with a wavelength between 480 nm and 650 nm; and the beam-splitting portion further includes a filter, configured to reflect light with a wavelength between 480 nm and 650 nm, transmit light with a wavelength greater than 650 nm and partially transmit and partially reflect light with a wavelength less than 480 nm.

Optionally, when the second excitation light has a same propagation path as the excitation light, the beam-combining portion includes a filter, configured to reflect light with a wavelength less than 480 nm or greater than 650 nm, and transmit light with a wavelength between 480 nm and 650 nm; and the beam-splitting portion further includes a filter, configured to transmit light with a wavelength between 480 nm and 650 nm, reflect light with a wavelength greater than 650 nm, and partially transmit and partially reflect light with a wavelength less than 480 nm.

Optionally, when the first wavelength converting layer includes the red phosphor which absorbs the excitation light to generate the excited light containing near-infrared light, the second wavelength converting layer includes yellow phosphor.

Optionally, when the second excitation light has a same propagation path as the excitation light, the beam-combining portion includes a filter, configured to transmit light with a wavelength greater than 650 nm, and reflect light with a wavelength less than 650 nm; and the beam-splitting portion further includes a filter, configured to reflect light with a wavelength between 480 nm and 650 nm, transmit light with a wavelength greater than 650 nm, and partially transmit and partially reflect light with a wavelength less than 480 nm.

Optionally, when the first excitation light has a same propagation path as the excitation light, the beam-combining portion includes a filter, configured to reflect light with a wavelength greater than 650 nm, and transmit light with a wavelength less than 650 nm; and the beam-splitting portion further includes a filter, configured to transmit light with a wavelength between 480 nm and 650 nm, reflect light with a wavelength greater than 650 nm, and partially transmit and partially reflect light with a wavelength less than 480 nm.

Optionally, the light-emitting device further included:

a first condenser lens disposed between the first wavelength conversion device and the beam-splitting-combining plate and, meanwhile, disposed at the outgoing light path of the first excitation light and the first excited light; and a second condenser lens disposed between the second wavelength conversion device and the beam-splitting-combining plate and, meanwhile, disposed at the outgoing light path of the second excitation light and the second excited light.

A projection system, comprising any of the above-disclosed light-emitting devices.

Compared with existing technologies, the technical solutions provided by the present disclosure have the following advantages.

Through the beam-splitting portion of the beam-splitting-combining plate, the disclosed light-emitting device and projection system are able to split the excitation light emitted from a same light source into a first excitation light and a second excitation light in different propagation paths, thereby generating different excited light. Thus, the number of the light sources is reduced, and the size and cost of the disclosed light-emitting device and projection system is reduced. Further, through the beam-combining portion disposed at the periphery of the beam-splitting portion, the disclosed light-emitting device and projection system are able to combine the first excited light and the reflected second excitation light into one beam. Because the beam-splitting portion and the beam-combining portion is disposed at the same beam-splitting-combining plate, the number of the filters is reduced, and the size and cost of the light-emitting device and projection system is further reduced.

BRIEF DESCRIPTION OF THE DRAWINGS

To more clearly illustrate the embodiments of the present disclosure or the technical solutions of the prior art, the drawings used in the description of the disclosed embodiments or the prior art will be briefly described below. It is apparent that the drawings in the following description are embodiments of the present disclosure, and other drawings may be obtained by a person of ordinary skill in the art in view of the drawings provided without creative efforts.

DETAILED DESCRIPTION

As discussed in the background technologies, because the existing projection system relies on couple light sources to generate excited light, and different filters to filter or combined different excited light, the size of the projection system may be bulky and the cost may be high.

In view of this, the present disclosure provides a light-emitting device directed to solve the problems set forth above.

The device including: a light source configured to emit excitation light; a beam-splitting-combining plate disposed in an outgoing light path of the excitation light, wherein the beam-split-combination plate includes a beam-splitting portion configured to split the excitation light into a first excitation light and a second excitation light along different propagation paths; a first wavelength conversion device disposed in art outgoing light path of the first excitation light, and having a first wavelength converting layer, wherein the first wavelength converting layer is configured to absorb the first excitation light to generate first excited light, and reflect the first excited light back to the beam-splitting-combining plate; a second wavelength conversion device disposed in an outgoing light path of the second excitation light and configured to reflect the second excitation light to the beam-splitting-combining plate; wherein the beam-splitting-combining plate further includes a beam-combining portion disposed a round the beam splitting portion, and the beam-combining portion is configured to combine the first excited light and the second excitation light, which is respectively reflected back to the beam-splitting-combining plate, into one beam.

The present disclosure also provides a projection system comprising a light-emitting device as described above.

Through the beam-splitting portion of the beam-splitting-combining plate, the light-emitting device and the projection system provided by the present disclosure may be able to split the excitation light emitted from a same light source into the first and second excitation light along different propagation paths, such that different excited light may be generated, while the number of the light sources may be reduced. Accordingly, the size and cost of the light-emitting device and the projection system may be reduced. In addition, through the beam-combining portion of the beam-splitting-combining plate, the light-emitting device and the projection system provided by the present disclosure may be able to combine the first excited light and the reflected second excitation light into one beam. Thus, the number of the filters may be reduced. Accordingly, the size and cost of the light-emitting device and the projection system ma be further reduced.

The above description illustrates the basic concept of the present disclosure. Other objectives, features and advantages of the present invention will become more apparent from the following detailed description of the disclosed embodiments, which are illustrated in conjunction with the accompanying drawings.

The description of the disclosed embodiments is provided to illustrate the present disclosure to those skilled in the art. It is apparent that the described embodiments are some but not all of the embodiments of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein.

Further, the disclosed embodiments will be described in detail with reference to the drawings, in which, for convenience of explanation, the sectional views of the device structure are not exaggerated in a general scale, and the schematic diagrams are merely examples and are not intended to limit the scope of the present disclosure. In addition, in the practical production, three-dimensional sizes (i.e., length, width and depth) should be included.

Certain embodiments will be illustrated in details.

First Embodiment

Figure 2:
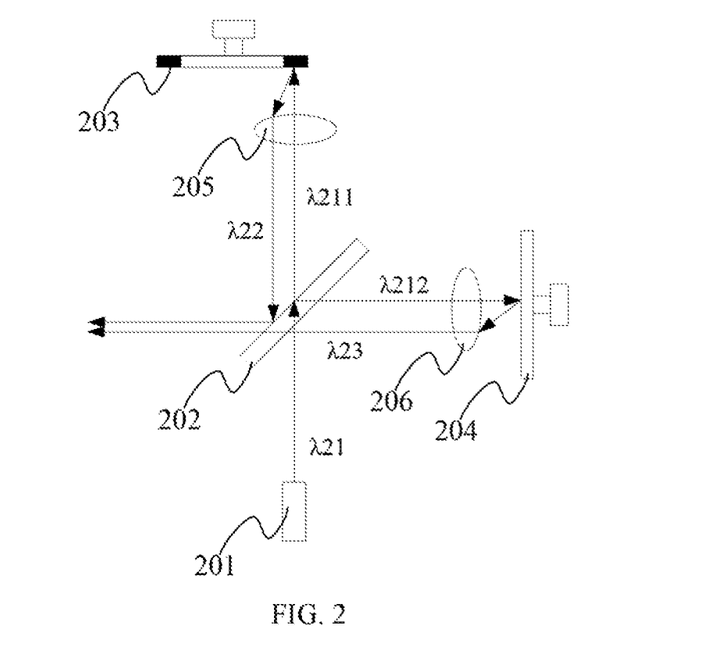
FIG. 2 illustrates a schematic diagram of an exemplary light-emitting device according to a first embodiment of the present disclosure.
Figure 3:
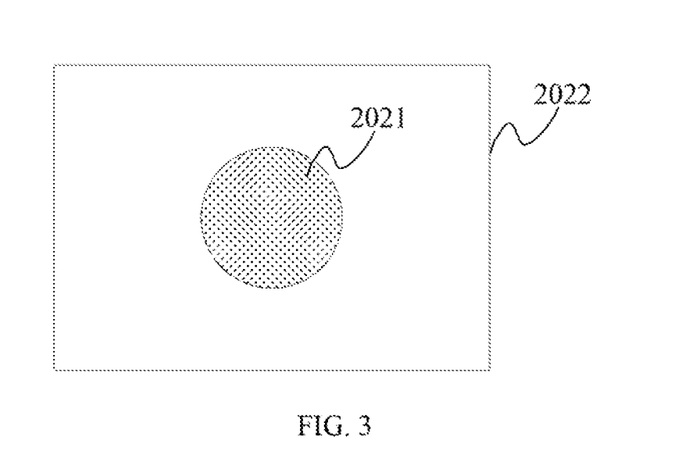
FIG. 3 illustrates an exemplary beam-splitting-combining plate according to a first embodiment of the present disclosure.

The present disclosure provides a light-emitting device. As shown in FIG. 2, the light-emitting device comprise: a light source 201 configured to emit excitation light $\lambda 21$; a beam-splitting-combining plate 202 disposed in an outgoing light path of the excitation light $\lambda 21$, wherein the beam-split-combination plate 202 may include a beam-splitting portion 2021 configured to split the excitation light $\lambda 21$ into a first excitation light $\lambda 211$ and a second excitation light $\lambda 212$ with different propagation paths; a first wavelength conversion device 203 disposed in an outgoing light path of the first excitation light $\lambda 211$, and including a first wavelength converting layer, wherein the first wavelength converting layer may be configured to absorb the first excitation light $\lambda 211$ to generate first excited light $\lambda 22$, and reflect the first excited light $\lambda 22$ back to the beam-splitting-combining plate 202; and a second wavelength conversion device 204 disposed in an outgoing light path of the second excitation light $\lambda 212$ and configured to reflect the second excitation light $\lambda 212$ to the beam-splitting-combining plate 202. The beam-splitting-combining plate 202 may further includes a beam-combining portion 2022 disposed around the beam-splitting portion 2021, and may be configured to combine the first excited light $\lambda 22$ and the second excitation light $\lambda 212$, which is respectively reflected to the beam-splitting-combining plate 202, into one beam. The beam-splitting portion 2021 and the beam-combining portion 2022 may be disposed at the same beam-splitting-combining plate 202. FIG. 3 illustrates an exemplary distribution of the beam-splitting portion 2021 and the beam-combining portion 2022 in the beam-splitting-combining plate 202. As shown in FIG. 3, the beam-splitting portion 2021 may be disposed in the central area of the beam-splitting-combining plate 202, while the beam-combining portion 2022 may be disposed in the peripheral area of the beam-splitting portion 2021.

In the disclosed embodiments, the light source 201 may be a laser light source emitting blue light, and the first wavelength converting layer of the first wavelength conversion device 203 may include yellow phosphor. The beam-splitting portion 2021 may include a semi-transmitting and semi-reflecting film, which splits the excitation light $\lambda 21$ into the first excitation light $\lambda 211$ and the second excitation light $\lambda 212$ along different propagation paths through transmitting or reflecting. The beam-combining portion 2022 may include a filter, which reflects the first excited light $\lambda 22$ and transmits the second excitation light $\lambda 212$.

As shown in FIG. 2, the excitation light $\lambda 21$ transmitted by the beam-splitting portion 2021 may be the first excited light $\lambda 211$, while the excitation light $\lambda 21$ reflected by the beam-splitting portion 2021 may be the second excitation light $\lambda 212$, which is for illustrative purposes and is not intended to limit the scope of the present disclosure. In particular, the ratio of the light transmitted or reflected by the beam-splitting portion 2021 may be adjusted according, to practical applications. Optionally, the ratio of transmission to reflection may be less than or equal to 7:3.

In addition, the propagation path of the first excitation light $\lambda 211$ after being transmitted by the beam-splitting portion 2021 may not change, instead, may remain substantially the same as the propagation path of the excitation light $\lambda 21$. However, the propagation path of the second excitation light $\lambda 212$ after being reflected by the beam-splitting portion 2021 may be changed. In particular, the propagation direction and the propagation angle of the second excitation light $\lambda 212$ may be related to the angle formed between the beam-splitting-combining plate 202 and the excitation light $\lambda 21$, which may be adjusted according to various practical applications.

In the disclosed embodiment, the second wavelength conversion device 204 may only include a reflector, which is configured to reflect the second excitation light $\lambda 212$ to the beam-splitting-combining plate 202. In another embodiment, the second wavelength conversion device 204 may also include a second wavelength converting layer, which is configured to absorb the second excitation light $\lambda 212$ to generate second excited light $\lambda 23$. Because the second wavelength conversion device 204 includes both the reflector and the second wavelength converting layer, the second excitation light and the second excited light after being reflected may have a smaller propagating angle and a better uniformity.

When the second wavelength conversion device 204 includes the second wavelength converting layer, the second wavelength converting layer may include yellow phosphor or red phosphor. In particular, the red phosphor may absorb the excitation light to generate excited light containing near infrared light. When the second wavelength converting layer includes yellow phosphor, the first wavelength converting layer may include red phosphor. When the second wavelength converting, layer includes red phosphor, the first wavelength converting layer may include yellow phosphor. At this moment, the beam-combining portion 2022 may combine the first excited light, the second excited light, and the second excitation light, which is respectively reflected to the beam-splitting-combining plate 202, into one beam.

In the disclosed embodiments, the light-emitting device may further include a first condenser lens 205 for converging the collimated light, which may be disposed between the first wavelength conversion device 203 and the beam-splitting-combining plate 202 and, meanwhile, disposed at the outgoing light path of the first excitation light $\lambda$211 and the first excited light $\lambda$22. The light-emitting device may further include a second condenser lens 206, which may be disposed between the second wavelength conversion device 204 and the beam-splitting-combining plate 202 and, meanwhile, disposed at the outgoing light path of the second excitation light $\lambda$212 or the outgoing light path of the second excitation light $\lambda$212 and the second excited light $\lambda$23.

In the disclosed embodiments, the blue light emitted from the light source 201 may pass through the beam-splitting portion 2021 of the beam-splitting-combining plate 202, then may be divided into the first blue light $\lambda$211 and the second blue light $\lambda$212. The first blue light beam $\lambda$211 may be incident onto the first wavelength conversion device 203 through the first condenser lens 205 to generate first excited light, i.e., the yellow light $\lambda$22. After being collimated by the first condenser lens 205, the yellow light $\lambda$22 may be incident onto the beam-combining portion 2022 of the beam-splitting-combining plate 202, and reflected by the beam-combining portion 2022. After being reflected by the second wavelength conversion device 204, the second blue light beam $\lambda$212 may be incident onto the beam-combining portion 2022 of the beam-splitting-combining plate 202, and transmitted by the beam-combining portion 2022. The yellow light $\lambda$22 and the second blue light beam $\lambda$212, which is respectively reflected and transmitted by the beam-combining portion 2022, may be combined into white light. After passing through a subsequent light-uniforming device and etc., the white light may be used to display projection images.

Through the beam-splitting portion of the beam-splitting-combining plate, the disclosed light-emitting device and projection system may be able to split the excitation light emitted from the same light source into the first and second excitation light with different propagation paths, such that different excited light may be generated, while the number of the light sources may be reduced. Accordingly, the size and cost of the light-emitting device and the projection system may be reduced. In addition, through the beam-combining portion disposed at the periphery area of the beam-combining portion, the disclosed light-emitting device and projection system may be able to combine the first excited light and the reflected second excitation light into one beam. Because the beam-splitting portion and the beam-combining portion is disposed at the same beam-splitting-combining plate, the number of the filters may be reduced, while the size and cost of the light-emitting device and projection system may be further reduced.

Second Embodiment

Figure 4:
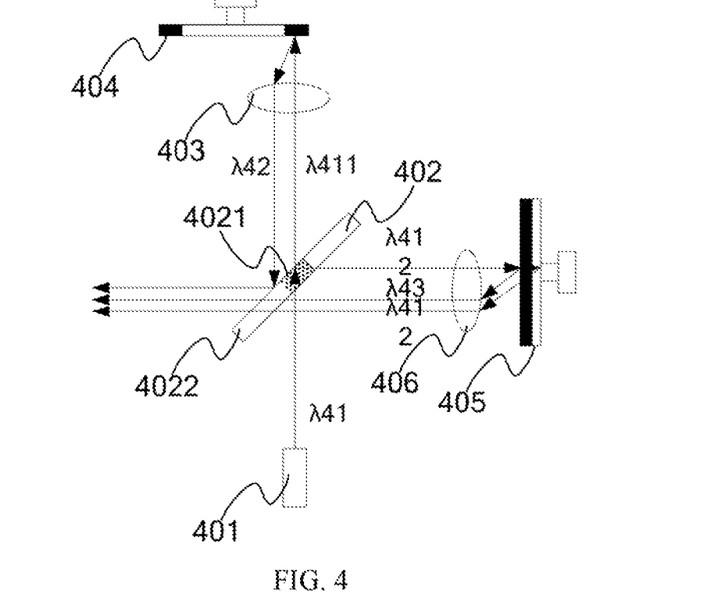
FIG. 4 illustrates a schematic diagram of another exemplary light-emitting device according to a second embodiment of the present disclosure.

The present disclosure provides a light-emitting device. As shown in FIG. 4, the light-emitting device may comprise: a light source 401 configured to emit excitation light $\lambda$41; a beam-splitting-combining plate 402 disposed in an outgoing light path of the excitation light $\lambda$41, wherein the beam-split-combination plate 402 may include a beam-splitting portion 4021 and a beam-combining portion 4022; a first condenser lens 403 and a first wavelength conversion device 404 having a first wavelength converting layer; and a second condenser lens 406 and a second wavelength conversion device 405 having a reflector and a second wavelength converting layer.

In particular, the beam-splitting portion 4021 may include a transflective film, which is configured to split the excitation light $\lambda$41 into a first excitation light $\lambda$411 and a second excitation light $\lambda$412 with different propagation paths. The first excitation tight $\lambda$411 and the second excitation light $\lambda$412 may have a same propagating path, as shown in FIG. 4. The beam-combining portion 4022 may include a filter, which is configured to combine the second excitation light $\lambda$412, second excited light $\lambda$43, and first excited light $\lambda$42 into one beam. The beam-splitting portion 4021 and the beam-combining portion 4022 may be disposed in the same beam-splitting-combining plate 42. The beam-splitting portion 4021 may be disposed in the central area of the beam-splitting-combining plate 402, while the beam-combining portion 4022 may be disposed in the peripheral area of the beam-splitting portion 4021.

In the disclosed embodiments, the beam-splitting portion 4021 may include a filter, configured to partially transmit and partially reflect the excitation light $\lambda$41, reflect the first excited light $\lambda$42, and transmit the second excited light $\lambda$43. The beam-combining portion 4022 may include a filter, configured to reflect the first excited light $\lambda$42, and transmit the second excited light $\lambda$43 and the second excitation light $\lambda$412.

Because the first excited light $\lambda$42, the second excited light $\lambda$43, and the second excitation light $\lambda$412 may each have a different wavelength range, the beam-combining portion 4022 may be able to combine the second excitation light $\lambda$412 the second excited light $\lambda$43, and the first excited light $\lambda$42 into one beam.

The inventors found that, as shown in FIG. 1, when blue light, green light and red light is combined into one beam through an existing method, the filter for combing light often filters out light with a wavelength larger than 590 nm, while the central wavelength of the red light is around 620 nm. Thus, most of the red and yellow light is filtered out when the light is combined, and the portion of near infrared light in the combined beam is substantially small, which may not meet the requirements of certain special projectors.

In view of this, in the disclosed embodiments, the excitation light emitted by the light source 401 may be blue light, and the first wavelength conversion layer of the first wavelength conversion device 404 may include yellow phosphor, through which yellow light may be generated under the excitation of the blue light. The second wavelength conversion layer of the second wavelength conversion device 405 may include red phosphor, through which red light containing near infrared light may generated under the excitation of the blue light. In addition, the present embodiment provides a beam-combining portion, which is capable of seamlessly combing light within a specific wavelength region into one beam through reflecting or transmitting, thereby solving the problem of substantially small portion of die near-infrared light in the combined beam in the existing technologies.

In particular, the beam-combining portion 4022 may include a filter, which is configured to transmit light with a wavelength less than 480 nm and greater than 650 nm, and reflect light with a wavelength between 480 nm and 650 nm. The beam splitting portion 4021 include a semi-transmitting and semi-reflecting film for light with a wavelength less than 480 nm, and a filter configured to reflect light with a wavelength between 480 nm and 650 nm and transmit light with a wavelength greater than 650 nm.

As shown in FIG. 4, after the blue light λ41 emitted by the light source 401 is split by the beam-splitting portion 4021 of the beam-splitting-combining plate 402, the blue light λ41 with a wavelength of less than 480 nm may be divided into the first blue light λ411 and the second blue light λ412 with different propagation paths. In particular, the first blue light λ411 may have the same propagation path as the blue light λ41.

After passing through the first condenser lens 403, the first blue light λ411 may be incident onto the first wavelength conversion device 404 and generate the first excited light, i.e., the yellow light λ42, which may be collimated by the first condenser lens 403, then incident onto the beam-combining portion 4022 of the beam-splitting-combining plate 402. Portion of the yellow light λ42, whose wavelength is greater than 480 nm and less than 650 nm, may be reflected by the beam-combining portion 4022.

After passing through the second condenser lens 406, the second blue light λ412 may be incident onto the second wavelength conversion device 405. The second blue light λ412 may be partially reflected to the beam-combining portion 4022 of the beam-splitting-combining plate 402 by the reflector, and partially absorbed by the second wavelength conversion, device 405 to generate the second excited light, i.e., red light λ43 containing near-infrared light. The red light λ43 may be collimated by the second condenser lens 406, then incident onto the beam-combining portion 4022 of the beam-splitting-combining plate 402. In particular, the second blue light λ412 with a wavelength of less than 480 nm and portion of the red light λ43 whose wavelength is greater than 650 nm, may be transmitted by the beam-combining portion 4022;

Light with a wavelength less than 480 nm which is transmitted by the beam-combining portion 4022, light with a wavelength greater than 480 nm and less than 650 nm which is reflected by the beam-combining portion 4022, and light with a wavelength greater than 480 nm which is transmitted by the beam-combining portion 4022, may be seamlessly combined into one beam, satisfying the requirements of various projectors.

In the disclosed embodiments, the wavelength region is divided by 650 nm, because yellow light may be configured to have a loss within 10% at 650 nm, and near-infrared light with a dominant wavelength near 690 nm may also be configured to have a loss within 10% at 650 nm. In certain embodiments, the wavelength region may be divided according to various application scenarios.

In another embodiment, when the second blue light λ412 has the same propagation path as the blue light λ41, the positions of the first wavelength conversion device 404 and the second wavelength conversion device 405 may be exchanged. In this case, the beam-splitting portion may partially transmit and partially reflect the excited light, through which the first excited light may be transmitted and the second excited light may be reflected. The beam-combing portion may include a filter, configured to transmit the first excited light, and reflect the second excited light and the second excitation light. Further, because the wavelength ranges of the first excited light, after respectively passing through the beam-combing portion, the second excited light, and the second excitation light are different, the first excited light, the second excited light, and the second excitation light may be combined into one beam.

In particular, the beam-combing portion may include a filter configured to reflect light with a wavelength less than 480 nm and light with a wavelength greater than 650 nm, and transmit light with a wavelength between 480 nm and 650 nm. Meanwhile, the beam-splitting portion may include a semi-transmitting and semi-reflecting film for light with a wavelength less than 480 nm, and a filter configured to transmit light with a wavelength between 480 nm and 650 nm and reflect light with a wavelength greater than 650 nm. The principle of combining the light into one beam is the same as that of other disclosed embodiments, and will not be repeated here.

In the disclosed light-emitting device, before being incident onto the wavelength conversion device, the excitation light may have a substantially small be spot and propagating angle, such that the excitation light may be split by the beam-splitting portion. After the excitation light is incident onto the wavelength conversion device, the outgoing excited light may have an increased beam spot and propagating angle, such that the whole area of the beam-splitting-combing plate may be filled with the excited light incident onto the beam-splitting-combing plate. However, because the beam-splitting portion may also include the filter, which reflects or transmits light with a wavelength between 480 nm and 650 nm, and transmits or reflects light with a wavelength greater than 650 nm, even when the light reflected to the beam-splitting-combing plate is incident onto the beam-splitting portion, the filter in the beam-splitting portion may be still able to combine light into one beam. Thus, the light loss at the beam-splitting portion may be neglected.

In the disclosed embodiments, because the light source requires a substantially small portion of red light, and the red phosphor has a substantially high efficiency at low power and low temperature, the ratio of the second blue light λ412 for exciting the red phosphor may be configured to be substantially small. That is, the ratio of the first blue light λ411 and the second blue light λ412 may be greater than or equal to 7:3.

Through reducing the number of the light sources and filters and, meanwhile, transmitting or reflecting light in different wavelength ranges by the beam-splitting-combining sheet, the disclosed light-emitting device may seamlessly form continuous white light. Accordingly, the loss of the light when being combined may be reduced, while the near-infrared light may be retained, enhancing the combined beam and increasing the energy of the near-infrared light contained in the combined beam.

Third Embodiment

Figure 5:
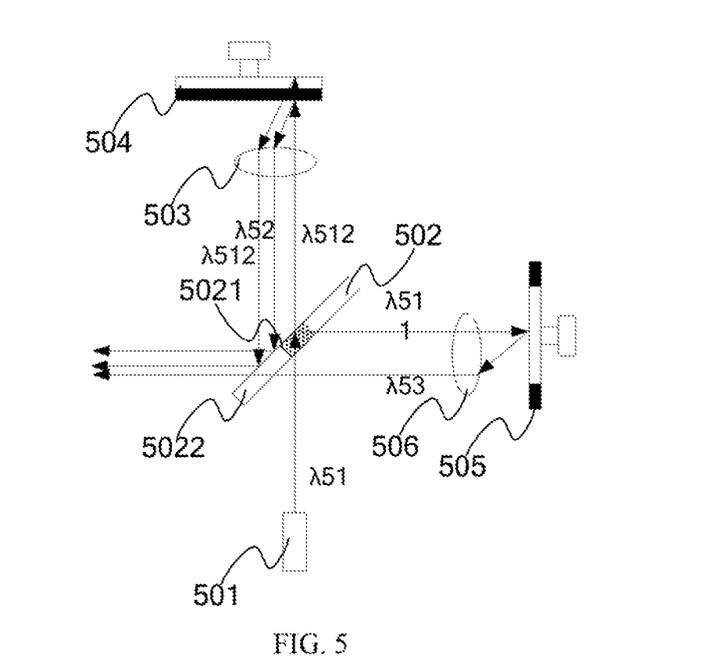
FIG. 5 illustrates a schematic diagram of another exemplary light-emitting device according to a third embodiment of the present disclosure.

The present disclosure provides a light-emitting device, which mainly differs from the light-emitting device of other disclosed embodiments in that: the first wavelength converting layer in the first wavelength conversion device may include red phosphor, the excited light generated by the red phosphor may include near-infrared light, the second wavelength converting layer in the second wavelength conversion device having the reflecting plate may include yellow phosphor, and the second excitation light may have the same propagation path as the excited light. The disclosed light-emitting device is illustrated in FIG. 5.

In particular, the beam-splitting portion of the beam-splitting-combination plate may include a filter, configured to partially transmit and partially reflect the excitation light, transmit the first excited light, and reflect the second excited light. The beam-combining portion may include a filter, configured to transmit the first excited light, and reflect the second excited light and the second excitation light.

The beam-splitting portion may include a semi-transmitting and semi-reflecting film for light with a wavelength less than 480 nm, and a filter configured to reflect light with a wavelength between 480 nm and 650 nm and transmit light with a wavelength greater than 650 nm. Meanwhile, the beam-combing portion may include a filter, configured to transmit light with a wavelength greater than 650 nm, and reflect light with a wavelength less than 650 nm.

After blue light $\lambda 51$ emitted by a light source 510 is split by a beam-splitting portion 5021 of a beam-splitting-combining plate 502, the blue light with a wavelength of less than 480 nm may be divided into a first blue light $\lambda 511$ and a second blue light $\lambda 512$ with different propagation paths. In particular, the second blue light $\lambda 512$ may have the same propagation path as the blue light $\lambda 51$. Because a second wavelength conversion device 504 may be disposed in the outgoing path of the second blue light $\lambda 512$, the second wavelength conversion device 504 may be disposed in the outgoing path of the blue light $\lambda 51$, as shown in FIG. 5.

After passing through a second condenser lens 503, the second blue light $\lambda 512$ may be incident onto the second wavelength conversion device 504, through which the second blue light $\lambda 512$ may be partially reflected to the beam-splitting-combining plate 502 and partially absorbed to generate second excited light, i.e., the yellow light $\lambda 52$. The yellow light $\lambda 52$ may be collimated by the second condenser lens 503, then, incident onto the beam-splitting-combining, plate 502. In particular, the portion of the yellow light $\lambda 52$, whose wavelength is less than 650 nm, may be reflected by a beam-combining portion 5022.

After passing through a first condenser lens 506, the first blue light $\lambda 512$ may be incident onto a first wavelength conversion device 505, and absorbed by the first wavelength conversion device 505 to generate first excited light, i.e., red light $\lambda 53$ containing near-infrared light. The red light $\lambda 53$ may be collimated by the first condenser lens 506, then incident onto the beam-combining portion 5022 of the beam-splitting-combining plate 502. In particular, the portion of the red light $\lambda 53$ whose wavelength is greater than 650 nm may be transmitted by the beam-combining portion 5022.

Light with a wavelength less than 650 nm which is reflected by the beam-combining portion 5022, and light with a wavelength greater than 650 nm which is transmitted by the beam-combining portion 5022, may be seamlessly combined into one beam, satisfying the requirements of various projectors.

In another embodiment, when the first blue light $\lambda 511$ has the same propagation path as the blue light $\lambda 51$, the positions oldie first wavelength conversion device 505 and the second wavelength conversion device 504 may be exchanged. In this case, the beam-splitting portion may be configured to partially transmit and partially reflect the excitation light, reflect the first excited light, and transmit the second excited light. The beam-combing portion may include a filter, configured to reflect the first excited light, and transmit the second excited light and the second excitation light.

In particular, the beam-splitting portion may include a semi-transmitting and semi-reflecting film for light with a wavelength less than 480 nm and a filter configured to transmit light with a wavelength between 480 nm and 650 nm and reflect light with a wavelength greater than 650 nm. Meanwhile, the beam-combing portion of the beam-splitting-combining plate may include a filter, configured to reflect light with a wavelength greater than 650 nm and transmit light with a wavelength less than 650 nm. The principle of combining the light into one beam is the same as that of other disclosed embodiments, and will not be repeated here.

Through reducing the number of the light sources and filters and, meanwhile, transmitting or reflecting light in different wavelength ranges by the beam-splitting-combining sheet, the disclosed light-emitting device may seamlessly form continuous white light. Accordingly, the loss of the light when being combined be reduced, while the near-infrared light may be retained, enhancing the combined beam and increasing the energy of the near-infrared light contained in the combined beam.

Fourth Embodiment

The present disclosure provides a light-emitting device, which mainly differs from the light-emitting device of other disclosed embodiments in that: the excitation light emitted by the light source may include blue light and UV light. In this case, the beam-splitting portion of the beam-splitting-combining plate may be configured to reflect or transmit light with a wavelength between 420 nm and 480 nm, such that the UV light emitted by the light source may be filtered out. The transmitting or reflecting wavelength of the beam-combining portion may also be adjusted accordingly.

For example, after the excitation light passes through the beam-splitting portion of the beam-splitting-combining plate, light with a wavelength between 420 nm and 480 nm may be split into two light, which are respectively incident onto the first wavelength conversion device and the second wavelength conversion device. The generated first excited light and second excited light, as well as the second excitation light may be reflected to the beam-combing portion of the beam-splitting-combining plate, respectively. Light with a wavelength between 420 nm and 480 nm may be transmitted, the first excited light with a wavelength between 480 nm and 650 nm may be reflected, and the second excited light a wavelength between greater than 650 nm may be transmitted, which is then combined into one beam. After passing through a subsequent light-uniforming device and etc., the combined beam may be used to display projection images.

Through reducing the number of the light sources and filters and, meanwhile, transmitting or reflecting light in different wavelength ranges by the beam-splitting-combining sheet, the disclosed light-emitting device may seamlessly form continuous white light. Accordingly, the loss of the light when being combined may be reduced, while the near-infrared light may be retained, enhancing the combined beam and increasing the energy of the near-infrared light contained in the combined beam.

Fifth Embodiment

The present disclosure also provides a projection system, which may include any of the disclosed light-emitting devices. Through splitting then combing light, the number of the light sources and filters may be reduced and, thus, the size and the cost of the projection system may be reduced. Further, through adopting the beam-splitting-combining sheet capable of transmitting or reflecting light in different wavelength ranges, continuous white light may be seamlessly formed. The loss of the light when being combined may be reduced, while the near-infrared light may be retained, enhancing the combined beam and increasing the energy of the near-infrared light contained in the combined beam.

Various embodiments of the present specification are described in a progressive manner, in which each embodiment focusing on aspects different from other embodiments, and the same and similar parts of each embodiment may be referred to each other. The foregoing description of the disclosed embodiments will enable those skilled in the art to make or use the invention. Various modifications to these embodiments will be readily apparent to those skilled in the an, and the generic principles defined herein may be applied to other embodiments without departing from the spirit or scope of the invention. Accordingly, the claims cover all modifications made by those skilled in the art to without departing from the spirit or scope of the invention.

What is claimed is:

1. A light-emitting device, comprising:
a light source, configured to emit excitation light;
a beam-splitting-combining plate disposed in an outgoing light path of the excitation light, wherein the beam-split-combination plate includes a beam-splitting portion configured to split the excitation light into a first excitation light and a second excitation light with different propagation paths;
a first wavelength converter disposed in an outgoing light path of the first excitation light, and including a first wavelength converting layer configured to absorb the first excitation light to generate first excited light, and reflect the first excited light to the beam-splitting-combining plate; and
a second wavelength converter disposed in an outgoing light path of the second excitation light and configured to reflect a portion of the second excitation light to the beam-splitting-combining plate,
wherein the beam-splitting-combining plate further includes a beam-combining portion disposed around the beam-splitting portion,
the beam-combining portion is configured to combine the first excited light and the second excitation light respectively reflected to the beam-splitting-combining plate into one beam, and
the second wavelength converter further a second wavelength converting layer configured to absorb another portion of the second excitation light to generate a second excited light, and reflect the second excited light to the beam-splitting-combining plate.

2. The light-emitting device according to claim 1, wherein, the beam-splitting portion is disposed at a central area of the beam-splitting-combining plate, and the beam-splitting portion includes a 50/50 transflective film.

3. The light-emitting device according to claim 1, wherein, when the second wavelength converter further includes the second wavelength converting layer, the beam-combining portion is configured to combine the first excited light, the second excited light, and the second excitation light respectively reflected to the beam-splitting-combining plate into one beam.

4. The light-emitting device according to claim 3, wherein, the beam-combining portion includes a filter, configured to reflect the first excited light and transmit the second excited light and the second excitation light, or a filter, configured to transmit the first excited light and reflect the second excited light and the second excitation light.

5. The light-emitting device according to claim 4, wherein, the beam-splitting portion includes a filter, configured to partially transmit and partially reflect the excitation light, reflect the first excited light, and transmit the second excited light, or a filter, configured to partially transmit and partially reflect the excitation light, transmit the first excited light, and reflect the second excited light.

6. The light-emitting device according to claim 5, wherein, the first wavelength converter or the second wavelength converter includes red phosphor, and the red phosphor absorbs the excitation light to generate excited light containing near-infrared light.

7. The light-emitting device according to claim 6, wherein, when the second wavelength converter includes the red phosphor and the red phosphor absorbs the excitation light to generate the excited light containing near-infrared light, the first wavelength converter includes yellow phosphor.

8. The light-emitting device according to claim 7, wherein, when the first excitation light has a same propagation path as the excited light, the beam-combining portion includes a filter configured to transmit light with a wavelength less than 480 nm and greater than 650 nm, and reflect light with a wavelength between 480 nm and 650 nm; and
the beam-splitting portion further includes a filter configured to reflect light with a wavelength between 480 nm and 650 nm, transmit light with a wavelength greater than 650 nm, and partially transmit and partially reflect light with a wavelength less than 480 nm.

9. The light-emitting device according to claim 7, wherein, when the second excitation light has a same propagation path as the excited light, the beam-combining portion includes a filter configured to reflect light with a wavelength less than 480 nm and greater than 650 nm, and transmit light with a wavelength between 480 nm and 650 nm; and
the beam-splitting portion further includes a filter configured to transmit light with a wavelength between 480 nm and 650 nm, reflect light with a wavelength greater than 650 nm, and partially transmit and partially reflect light with a wavelength less than 480 nm.

10. The light-emitting device according to claim 6, wherein, when the first wavelength converter includes the red phosphor absorbing the excitation light to generate the excited light containing near-infrared light, the second wavelength converter includes yellow phosphor.

11. The light-emitting device according to claim 10, wherein, when the second excitation light has a same propagation path as the excited light, the beam-combining portion includes a filter, configured to transmit light with a wavelength greater than 650 nm, and reflect light with a wavelength less than 650 nm; and
the beam-splitting portion further includes a filter, configured to reflect light with a wavelength between 480 nm and 650 nm, transmit light with a wavelength greater than 650 nm, and partially transmit and partially reflect light with a wavelength less than 480 nm.

12. The light-emitting device according to claim 10, wherein, when the first excitation light has a same propagation path as the excited light, the beam-combining portion includes a filter, configured to reflect light with a wavelength greater than 650 nm, and transmit light with a wavelength less than 650 nm; and
the beam-splitting portion further includes a filter, configured to transmit light with a wavelength between 480 nm and 650 nm, reflect light with a wavelength greater than 650 nm, and partially transmit and partially reflect light with a wavelength less than 480 nm.

13. The light-emitting device according to claim 8, further including:
a first condenser lens disposed between the first wavelength converter and the beam-splitting-combining plate and, meanwhile, disposed at the outgoing light path of the first excitation light and the first excited light; and a second condenser lens disposed between the second wavelength converter and the beam-splitting-combining plate and, meanwhile, disposed at the outgoing light path of the second excitation light and the second excited light.

14. A projection system, comprising a light-emitting device, wherein the light-emitting device comprising:
a light source, configured to emit excitation light;
a beam-splitting-combining plate disposed in an outgoing light path of the excitation light, wherein the beam-split-combination plate includes a beam-splitting portion configured to split the excitation light into a first excitation light and a second excitation light with different propagation paths;
a first wavelength converter disposed in an outgoing light path of the first excitation light, and including a first wavelength converting layer configured to absorb the first excitation light to generate first excited light, and reflect the first excited light to the beam-splitting-combining plate; and
a second wavelength converter disposed in an outgoing light path of the second excitation light and configured to reflect a portion of the second excitation light to the beam-splitting-combining plate,
wherein the beam-splitting-combining plate further includes a beam-combining portion disposed around the beam-splitting portion,
the beam-combining portion is configured to combine the first excited light and the second excitation light respectively reflected to the beam-splitting-combining plate into one beam, and
the second wavelength converter includes a second wavelength converting layer configured to absorb another portion of the second excitation light to generate a second excited light, and reflect the second excited light to the beam-splitting-combining plate.

15. The light-emitting device according to claim 9, further including:

a first condenser lens disposed between the first wavelength converter and the beam-splitting-combining plate and, meanwhile, disposed at the outgoing light path of the first excitation light and the first excited light; and
a second condenser lens disposed between the second wavelength converter and the beam-splitting-combining plate and, meanwhile, disposed at the outgoing light path of the second excitation light and the second excited light.

16. The light-emitting device according to claim 11, further including:
a first condenser lens disposed between the first wavelength converter and the beam-splitting-combining plate and, meanwhile, disposed at the outgoing light path of the first excitation light and the first excited light; and
a second condenser lens disposed between the second wavelength converter and the beam-splitting-combining plate and, meanwhile, disposed at the outgoing light path of the second excitation light and the second excited light.

17. The light-emitting device according to claim 12, further including:
a first condenser lens disposed between the first wavelength converter and the beam-splitting-combining plate and, meanwhile, disposed at the outgoing light path of the first excitation light and the first excited light; and
a second condenser lens disposed between the second wavelength converter and the beam-splitting-combining plate and, meanwhile, disposed at the outgoing light path of the second excitation light and the second excited light.

18. The projection system according to claim 14, wherein, the beam-splitting portion is disposed at a central area of the beam-splitting-combining plate, and the beam-splitting portion includes a 50/50 transflective film.

* * * * *